US012663613B2

(12) United States Patent　(10) Patent No.: US 12,663,613 B2
Lippman et al.　(45) Date of Patent: Jun. 23, 2026

(54) ARTIFICIALLY CURVED OPTICAL DETECTOR, AND METHODS AND SYSTEMS OF MAKING AND USING

(71) Applicant: UNIVERSITY OF ROCHESTER, Rochester, NY (US)

(72) Inventors: David Henry Lippman, Rochester, NY (US); Duncan T. Moore, Fairport, NY (US); Greg Richard Schmidt, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 500 days.

(21) Appl. No.: 18/168,926

(22) Filed: Feb. 14, 2023

(65) Prior Publication Data

US 2023/0258909 A1　Aug. 17, 2023

Related U.S. Application Data

(60) Provisional application No. 63/268,074, filed on Feb. 16, 2022.

(51) Int. Cl.
G02B 13/00　(2006.01)
G02B 3/00　(2006.01)
(Continued)

(52) U.S. Cl.
CPC ......... G02B 13/004 (2013.01); G02B 3/0087 (2013.01); G02B 3/04 (2013.01); G02B 27/0037 (2013.01)

(58) Field of Classification Search
CPC ...... G02B 13/004; G02B 3/0087; G02B 3/04; G02B 27/0037; G02B 27/0025
(Continued)

(56) References Cited

U.S. PATENT DOCUMENTS 7,359,123 B1 * 4/2008 Mitchell ........... G02B 27/0025
359/652
7,428,106 B1 9/2008 Stone et al.
(Continued)

FOREIGN PATENT DOCUMENTS

DE　10039239 A1 * 3/2002 ............. G02B 13/06
JP　H103035 A * 1/1998
WO　WO-0231592 A1 * 4/2002 ......... G02B 19/0028

OTHER PUBLICATIONS

Wu Qi, et al. "Flat Transformation Optics Graded Index Lenses", 2012 6th European Conference on Antennas and Propagation (EUCAP), Mar. 1, 2021 p. 1701-1705.
(Continued)

*Primary Examiner* — William R Alexander
*Assistant Examiner* — Alaina Marie Swanson
(74) *Attorney, Agent, or Firm* — Ping Wang; Michael Ye; Kalos Athena Wang PLLC

(57)　ABSTRACT

This application uses an image detector to mitigate field curvature but without the need to curve the detector surface. Gradient-index (GRIN) media, which possesses spatially varying refractive index, is used as "cover piece" for planar detectors or internal images. Field curvature correction can be made at the detector or internal image using plane-parallel GRIN cover piece with a planar detector or an internal image. GRIN cover piece imparts a transversely varying image shift. In doing so, the number of elements in an optical system may be reduced since field curvature can be corrected at the detector, allowing for smaller and more lightweight systems.

20 Claims, 8 Drawing Sheets

(51) Int. Cl.
  *G02B 3/04*     (2006.01)
  *G02B 27/00*    (2006.01)

(58) Field of Classification Search
  USPC ............................................................ 359/715
  See application file for complete search history.

(56) References Cited

U.S. PATENT DOCUMENTS

| | | | | |
|---|---|---|---|---|
| 2002/0041445 | A1* | 4/2002 | Nishioka ............ | G02B 26/0825 |
| | | | | 359/627 |
| 2004/0008319 | A1* | 1/2004 | Lai ........................... | G02B 1/04 |
| | | | | 351/159.02 |
| 2005/0218124 | A1* | 10/2005 | Jennings ............ | B23K 26/0665 |
| | | | | 219/121.75 |
| 2008/0080060 | A1* | 4/2008 | Messerschmidt .. | G02B 23/2407 |
| | | | | 359/654 |
| 2008/0131052 | A1* | 6/2008 | Matsumura .......... | G02B 3/0087 |
| | | | | 385/33 |
| 2013/0241902 | A1* | 9/2013 | Konig .................. | G02B 3/0087 |
| | | | | 345/204 |
| 2014/0076398 | A1* | 3/2014 | Gordon ................ | G02B 3/0087 |
| | | | | 703/2 |
| 2016/0216527 | A1 | 7/2016 | Juhola et al. | |
| 2017/0173957 | A1* | 6/2017 | Williams ................. | B41J 2/164 |
| 2020/0000341 | A1* | 1/2020 | Messerschmidt .. | G02B 23/2469 |

OTHER PUBLICATIONS

International Search Report and Written Opinion issued in International Patent Application No. PCT/US2023/062590.

Betensky,E., Postmodern lens design, Article, Aug. 1993, pp. 1750-1756, vol. 32, No. 8, Optical Engineering, Redding, CT.

Gaschet. C., et al., Methodology to design optical systems with curved sensors, Research Article, Feb. 1, 2019, pp. 973-978, vol. 58, No. 4, Applied Optics, Pasadena, CA.

Guenter, B., et al., Highly curved image sensors: a practical approach for improved optical performance, Research Article, Jun. 12, 2017, pp. 13010-13023, vol. 25, No. 12, Optics Express, Malibu, CA.

Kee, Yeh Y., et al., A Novel CMOS Image Sensor Package Cover Glass White Stain Material Identification Metrology by TOF-SIMS, Article, 2021, International Symposium on the Physical and Failure Analysis of Integrated Circuits, Singapore.

Matthias, T., et al., CMOS Image Sensor Wafer-level Packaging, Article, 2011, International Conference on Electronic Pacakaging Technology and High Density Packaging, Austria.

Muslimov. E., et al., Combining freeform optics and curved detectors for wide field imaging: a polynomial approach over squared aperture, Research Article, Jun. 26, 2017, pp. 14598-14610, vol. 25, No. 13, Optics Express, Grenoble, France.

Sasian, J. et al., Proceedings of Spie, Article, Dec. 17, 2014, vol. 9293, 929322, International Optical Design Conference, Hawaii, United States.

Thompson, K., Description of the third-order optical aberrations of near-circular pupil optical systems without symmetry, Research Article, Jul. 2005, pp. 1389-1401, vol. 22, No. 7, Optical Research Associates, Westborough, MA.

Wallin, W., The Control of Petzval Curvature, Article, Dec. 1951, pp. 1029-1032, vol. 41, No. 12, Journal of the Optical Society of America, China Lake, CA.

* cited by examiner (a)

(b)

(a)

(b)

(a)　　　　　　　　　　(b)　　　　　　　　　　(c)

(a)                                                (b)

Freeform
curved image

Flat
image

Refractive index (a)            (b)

(a)

(b)

ARTIFICIALLY CURVED OPTICAL DETECTOR, AND METHODS AND SYSTEMS OF MAKING AND USING

This application claims priority from U.S. Provisional Application No. 63/268,074, filed Feb. 16, 2022, which is incorporated herein by reference.

FIELD

This application relates generally to field curvature correction in optical imaging, and in particular, the field of optical field flatteners and converters.

BACKGROUND

Conventionally, two-dimensional optical detectors for imaging are planar in geometry. Originally, for example, these detectors consisted of film with a planar backing such as a glass plate or a metal plate in an SLR camera. There are a small number of designs that used the flexibility of film to deform it into a cylindrical surface. Today, detectors are largely semiconductor-based (e.g., CCD, CMOS) where planar geometries are most compatible with photolithographic processes on planar silicon wafers. Semiconductor-based detectors can be mechanically deformed to a curved surface, but processes are not currently scalable where this is feasible for mass-production. Currently, the vast majority of optical systems apply planar image detectors.

Planar semiconductor-based image detectors typically possess a cover piece, which is a thin plane-parallel plate of glass located directly in front of the photosensitive elements. Conventionally, cover piece is made of a homogeneous material, and its primary purpose is to protect the delicate detector elements from damage by debris. A secondary purpose of cover piece is to serve as a convenient location for a spectral filter such as for filtering infrared light, which semiconductor-based detectors are typically sensitive to. However, positioning a plane-parallel plate in a focusing beam introduces optical aberrations, most notably spherical aberration, in an amount proportional to the plate thickness.

When using a planar detector, an optical system must present a planar image in order to be in focus on the planar detector. Current fabrication techniques limit detectors to planar surfaces, so field curvature aberrations must be corrected to produce "flat field" images that are in focus across the field-of-view.

Field curvature (FC) describes optical aberrations that result in a planar object being imaged to a curved image surface. For a rotationally symmetric optical system, the third-order FC aberrations are Petzval curvature and astigmatism. Petzval curvature results in the stigmatic imaging of a planar object to a paraboloidal surface, meaning rays in both the tangential and sagittal planes focus on the same paraboloidal surface. Astigmatism results in the astigmatic imaging of a planar object to paraboloidal surfaces of different curvature for rays in the tangential plane versus rays in the sagittal plane. Through third order, Petzval and astigmatism jointly describe the overall image surface for rays in the tangential and sagittal planes. Higher-order FC aberrations also result in imaging of a planar object to a rotationally symmetric curved surface (either stigmatically or astigmatically) but where the surface is of higher-order dependence than the paraboloidal Petzval and astigmatism surfaces. For optical systems lacking an axis of rotational symmetry, freeform FC aberrations can result in image surfaces, both stigmatic and astigmatic, that are non-rotationally symmetric.

The field curvature optical aberrations produce ideal images on curved surfaces (e.g., the human retina) rather than planar surfaces. This means FC aberrations such as astigmatism and Petzval must be corrected if a planar detector is used. Otherwise, the longitudinal image shift across the image results in varying amounts of defocus, which results in a decrease in image quality and image spatial resolution. To correct these aberrations, optical designers must incorporate multiple optical elements (lenses, mirrors, etc.) separated in space. For example, with a planar object, Petzval curvature has an image curvature of curvature Cp according to the Petzval sum over k surfaces, $$\frac{C_p}{n'_k} = -\sum_{j=1}^{k} \frac{\phi_j}{n_j n'_j} \tag{1}$$

where $\phi_j$ is the surface power and $n_j$, $n_j'$ are the refractive indices preceding and following the surface, respectively. From this expression, it can be seen that multiple surfaces of different sign power are required to sum to zero for a planar Petzval surface. In order to have the system power $\Phi \neq 0$ required for imaging, these surfaces must be separated in space. Thus, optical systems require multiple elements separated in space, leading to larger and heavier systems. In addition to Petzval curvature, correction of astigmatism and higher-order FC aberrations also require additional optical elements separated in space. The position of the system aperture stop is also influential in the amount of astigmatism and some higher-order FC aberrations.

Since correction of FC aberrations is achieved using additional optical elements in the lens design-leading to systems that are heavier and larger in volume-curved optical detectors are a "holy grail" for optical system design since field curvature aberrations can be tolerated.

The value of curved image detectors is that FC aberrations can be compensated for by the associated longitudinal shift in the ideal in-focus image position. This means stigmatic FC aberrations such as Petzval curvature can be fully corrected with an image detector of surface matching that of the curved image formed by the optical system. Astigmatic FC aberrations such as astigmatism can be largely corrected; however, the difference in focus position between tangential and sagittal rays remains. This effect can be mitigated to the highest degree with a curved image detector with the same surface as the curved medial image surface, which is the surface at the mid-point of the tangential and sagittal image surfaces. By compensating for FC aberrations with the detector, fewer optical elements are required for correcting aberrations, making optical systems smaller and more lightweight. These advantages are gained at the disadvantage that a difficult to fabricate curved image detector is required.

It continues to be the case that curved detectors are not easily mass-produced. Accordingly, there remains a need for methods and systems that can create a superior image without the need to use a curved image detector.

SUMMARY

An aspect of this application is an artificially curved optical detector comprising: a planar detector; a gradient index (GRIN) lens cover piece having an exterior surface and an interior surface, wherein the interior surface of the GRIN lens cover piece is directly adjacent to the planar detector, wherein the GRIN lens cover piece is capable of receiving electromagnetic radiation from a source on the exterior surface and further wherein the range of refractive index of the GRIN lens cover piece field flattens the received electromagnetic radiation as said radiation passes through the GRIN lens so as to reduce optical aberrations and form a planar image on a planar image surface of the planar detector.

In certain embodiments, the GRIN lens cover piece has a range of refractive index variation $\Delta n$ where $\Delta n < 2$.

In certain embodiments, the GRIN lens cover piece has a thickness under 8 mm. In certain embodiments, the GRIN lens cover piece field flattens the received electromagnetic radiation and reduces optical aberrations caused by Petzval curvature and astigmatism. In certain embodiments, the GRIN lens cover piece is made with a radial quadratic refractive index profile. In certain embodiments, the GRIN lens cover piece field flattens the received electromagnetic radiation and reduces higher-order field curvature optical aberrations. In certain embodiments the GRIN lens cover piece is placed at or near an internal image plane. When located at an internal image plane, the image plane could be inside the GRIN lens. For example, the GRIN lens cover piece could be placed on one or both sides of a reticle. In certain embodiments, the GRIN lens cover piece is made with both a radial quadratic refractive index profile and higher-order polynomial dependence profile. In certain embodiments, the GRIN lens cover piece is made with a non-monotonic refractive index profile. In certain embodiments, the GRIN lens cover piece is made with a freeform refractive index profile.

Another aspect of the application is an optical system, comprising: the artificially curved optical detector described herein; one or more optical elements wherein said optical elements are in an array, wherein said array of optical elements is in an alignment with said artificially curved optical detector, wherein said array is capable of receiving electromagnetic radiation from a source and wherein said received electromagnetic radiation passes through said optical elements and into said aligned artificially curved optical detector and wherein said aligned artificially curved optical detector field flattens the received electromagnetic radiation so as to image the received electromagnetic radiation onto an image surface as a planar image.

In certain embodiments, the optical elements are a plurality of optical elements. In certain embodiments, the optical elements comprise aspheric surfaces. In certain embodiments, the optical elements are rotationally symmetric. In certain embodiments, the optical elements are non-rotationally symmetric. In certain embodiments, the optical elements are refractive lenses that refract the received electromagnetic radiation so that higher-order field curvature optical aberrations occur. In certain embodiments, the optical system is positioned within a portable electronic device.

A further aspect of the application is a method of correcting field curvature aberrations in imaging electromagnetic radiation on a planar detector, comprising the steps of: producing a GRIN lens cover piece with a range of refractive index variation; positioning the GRIN lens cover piece adjacent to a planar detector or internal image, wherein said GRIN lens cover piece has an exterior surface and an interior surface, wherein said interior surface is directly adjacent to the planar detector or internal image; field flattening electromagnetic radiation received by the exterior surface of the GRIN lens cover piece so as to so as to reduce optical aberrations and form a planar image on a planar image surface of the planar detector or internal image.

In certain embodiments, the method comprises the further step of: refracting the received electromagnetic radiation through one or more optical elements prior to the exterior surface of the GRIN lens cover piece receiving the electromagnetic radiation. In certain embodiments, the optical aberrations are Petzval curvature and astigmatism. In certain embodiments, the optical aberrations are higher-order field curvature aberrations.

An aspect of the application is an artificially curved optical detector comprising: an internal image plane; a gradient index (GRIN) lens cover piece having an exterior surface and an interior surface, wherein the interior surface of the GRIN lens cover piece is directly adjacent to the internal image plane, wherein the GRIN lens cover piece is capable of receiving electromagnetic radiation from a source on the exterior surface and further wherein the range of refractive index of the GRIN lens cover piece field flattens the received electromagnetic radiation as said radiation passes through the GRIN lens so as to reduce optical aberrations and form a planar image on a planar image surface of the internal image plane.

An aspect of the application is an optical system, comprising: the artificially curved optical detector herein; one or more optical elements wherein said optical elements are in an array, wherein said array of optical elements is in an alignment with said artificially curved optical detector, wherein said array is capable of receiving electromagnetic radiation from a source and wherein said received electromagnetic radiation passes through said optical elements and into said aligned artificially curved optical detector and wherein said aligned artificially curved optical detector field flattens the received electromagnetic radiation so as to image the received electromagnetic radiation onto an image surface as a planar image.

An aspect of the application is a method of correcting field curvature aberrations in imaging electromagnetic radiation on an internal image plane, comprising the steps of: producing a GRIN lens cover piece with a range of refractive index variation; positioning the GRIN lens cover piece adjacent to an internal image plane, wherein said GRIN lens cover piece has an exterior surface and an interior surface, wherein said interior surface is directly adjacent to the internal image plane; field flattening electromagnetic radiation received by the exterior surface of the GRIN lens cover piece so as to so as to reduce optical aberrations and form a planar image on a planar image surface of the internal image plane.

DETAILED DESCRIPTION

Figure 1:
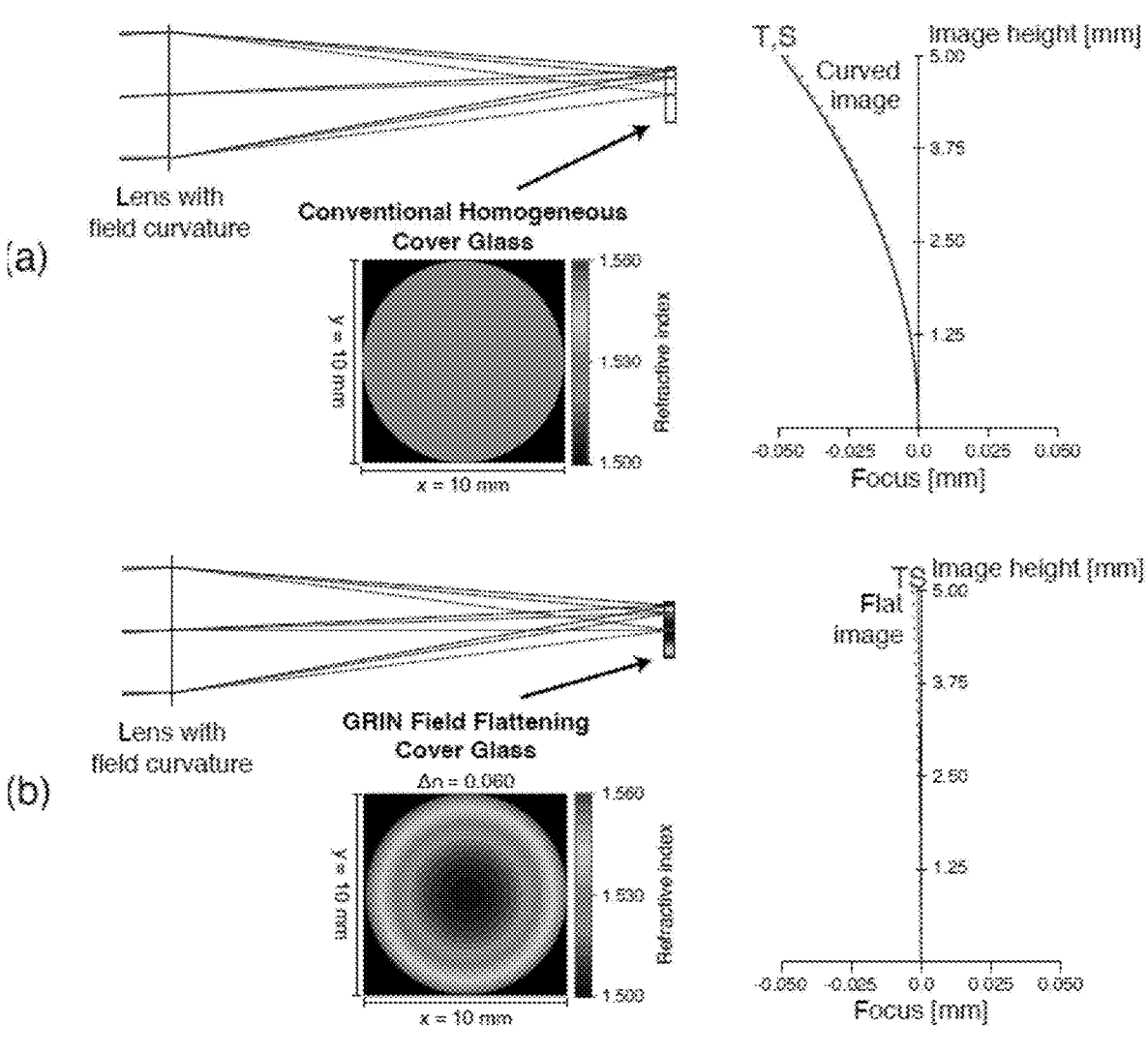
FIG. 1 shows a comparison of field curvature with conventional homogeneous cover piece and gradient index ("GRIN") field flattening cover piece. For the conventional case, (a) the curved image surface means the full field-of-view is out of focus when used with a planar detector. (b) The GRIN cover piece makes the full field-of-view be in focus with a planar detector.

Reference will be made in detail to certain aspects and exemplary embodiments of the application, illustrating examples in the accompanying structures and figures. The aspects of the application will be described in conjunction with the exemplary embodiments, including methods, materials and examples, such description is non-limiting and the scope of the application is intended to encompass all equivalents, alternatives, and modifications, either generally known, or incorporated here. Unless otherwise defined, all technical and scientific terms used herein have the same meaning as commonly understood by one of ordinary skill in the art to which this application belongs. One of skill in the art will recognize many techniques and materials similar or equivalent to those described here, which could be used in the practice of the aspects and embodiments of the present application. The described aspects and embodiments of the application are not limited to the methods and materials described.

As used in this specification and the appended claims, the singular forms "a," "an" and "the" include plural referents unless the content clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to 'the value,'" greater than or equal to the value" and possible ranges between values are also disclosed, as appropriately understood by the skilled artisan. For example, if the value "10" is disclosed the "less than or equal to 10" as well as "greater than or equal to 10" is also disclosed.

The term "cover piece" may refer to a cover glass or similar GRIN lens element. One of ordinary skill will understand that a GRIN cover piece may be made out of glass, but is not limited to only glass. One of ordinary skill will understand that a GRIN cover piece can be made out of any material suitable for forming a GRIN lens. One of ordinary skill will understand that the GRIN lens also doesn't have to be a cover glass for a detector; the GRIN lens can also be a GRIN field flattener placed at or near any internal image, or be part of a reticle or other optic placed at or near an internal image.

The term "directly adjacent" herein means that the interior surface of a GRIN cover piece may be either upon the surface of a planar detector itself (e.g., no space between the cover piece and the planar detector surface) or there may be a space of less than a few hundred microns between the interior surface of the GRIN cover piece and the surface of the planar detector. In certain embodiments, the interior surface of a GRIN cover piece may be placed at a detector and/or at internal image planes. In particular embodiments, there can also be multiple internal image planes as in the case of a relay optical system. In a preferred embodiment, there is no space between the interior surface of the GRIN cover piece and the surface of the planar detector. In other embodiments, the separating space between the interior surface of the GRIN cover piece and the surface of the planar detector is in the range of less than 1 micron, less than 2 microns, less than 5 microns, less than 10 microns, less than 30 microns, less than 40 microns, less than 50 microns, less than 60 microns, less than 70 microns, less than 80 microns, less than 90 microns, less than 100 microns, less than 110 microns, less than 120 microns, less than 130 microns, less than 140 microns, less than 150 microns, less than 160 microns, less than 170 microns, less than 180 microns, less than 180 microns, less than 190 microns, less than 200 microns, less than 250 microns or less than 300 microns.

In further embodiments, the separating space between the interior surface of the GRIN cover piece and the surface of the planar detector is in the range of about 1-2 microns, 1-5 microns, 1-10 microns, 1-30 microns, 1-40 microns, 1-50 microns, 1-60 microns, 1-70 microns, 1-80 microns, 1-90 microns, 1-100 microns, 1-110 microns, 1-120 microns, 1-130 microns, 1-140 microns, 1-150 microns, 1-160 microns, 1-170 microns, 1-180 microns, 1-180 microns, 1-190 microns, 1-200 microns, 1-250 microns or 1-300 microns.

The term "large field-of-view" herein means a full-field-of-view greater than 40 degrees.

Artificially Curved Optical Detectors

This application describes an alternative to curved detectors where the same optical behavior can be attained with conventional planar detectors. This is done with the addition of a gradient index (GRIN) optic directly adjacent to a planar detector. GRIN leverages a spatial variation in refractive index to offer new degrees of freedom for optical influence. This GRIN field flattening optic yields spherical detector behavior using a radial GRIN in contact with a planar detector. Aspherical or even freeform detector behavior can also be achieved with more advanced GRIN profiles.

Typical detectors have a thin homogeneous glass window positioned very close to the detector known as "cover piece" for protecting the circuitry. The method and systems described herein can be conveniently incorporated as a GRIN cover piece with a planar detector. GRIN fabrication techniques, such as 3D printing, can directly print the GRIN field flattener on the detector. In the present application, GRIN fabrication techniques include, but are not limited to, ion exchange, polymer nanolayering, direct laser writing, lithography/photopolymerization, chemical etching, chemical deposition, additive manufacturing (e.g., 3D printing), and E beam pattering. In a preferred embodiment, GRIN cover piece is directly deposited on a detector, which would then have no space between cover piece and detector. One of ordinary skill will understand that the method of manufacture may be chosen with regard to whether a monotonic radial profile is desired or whether a non-monotonic or freeform profile is desired. One of ordinary skill will also understand that the particular mode of manufacture or material used to create the GRIN cover piece is not limiting on the methods and systems described herein.

Mitigating Field Curvature by Imparting a Transversely Varying Image Shift

Figure 2:
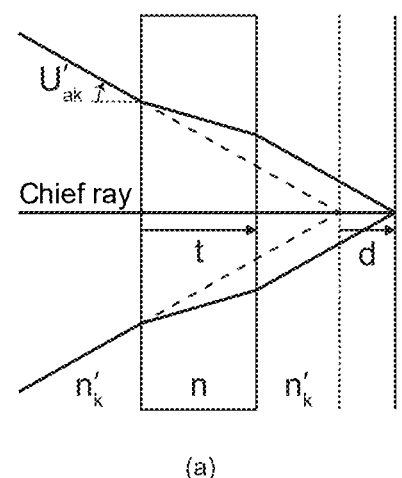
FIG. 2 shows longitudinal image shift d due to a plane-parallel plate of thickness/and refractive index n. (a) Homogeneous plate results in a constant shift d, regardless of image height. As drawn, the focusing cone of rays are telecentric, meaning the chief ray (cone's altitude) is normally incident on the plate and image plane. (b) GRIN plate with a transversely varying refractive index n(x,y) results in a transversely varying d(x,y) image shift.
Figure 2:
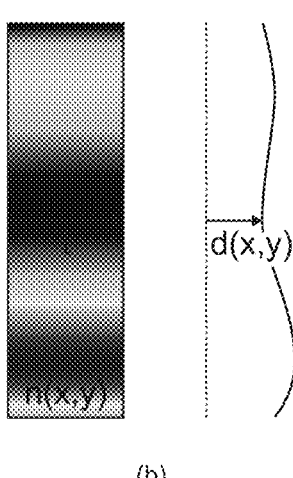

The basis for the methods and systems described herein is the fact that inserting a plane-parallel plate such as cover piece in focusing light results in a longitudinal shift of the focused image position [see FIG. 2(a)]. The amount of longitudinal focus shift & can be derived from Snell's law when focusing through a plane-parallel plate of thickness t and homogeneous refractive index n, $$d = t\left(1 - \sqrt{\frac{1 - NA^2}{n^2 - NA^2}}\right) \tag{2}$$

where $$NA = |n'_k \sin U'_{ak}|$$

is the numerical aperture of the focusing cone of rays. Eq. (2) is only exact when the field-of-view is telecentric, meaning the chief ray (the ray cone's altitude) is normally incident on the planar surface, as drawn in FIG. 2(a). For the paraxial case (small NA), this expression can be written more simply as $$d \approx t\left(\frac{n-1}{n}\right). \tag{3}$$

rather than using a curved image detector, an alternate means of mitigating FC at the detector can be achieved by imparting a transversely varying image shift d(x,y) of opposite amount to any FC. This way a curved image produced by an optical system can be flattened by imparting the appropriate transversely varying image shift d(x,y). In doing so, the image now lies on a plane, making it compatible with planar image detectors. This requisite transversely varying image shift a(x,y) can be obtained using a GRIN optic with the appropriate spatially varying refractive index n(x,y) [see FIG. 2(a)], according to Eq. (2), $$d(x, y) = t\left(1 - \sqrt{\frac{1 - NA^2}{n^2(x, y) - NA^2}}\right) \tag{4}$$

where the same requirement on telecentricity applies as for Eq. (2). Solving for n(x,y) in terms of d(x,y) in Eq. (4) yields $$n(x, y) = \sqrt{\frac{t^2 + [d(x, y) - 2t]d(x, y)NA^2}{[t - d(x, y)]^2}}. \tag{5}$$

For the paraxial case (small NA), this expression can be written more simply as $$n(x, y) \approx \frac{t}{t - d(x, y)}. \tag{6}$$

Field Curvature Correction Using GRIN Cover Piece

Figure 3:
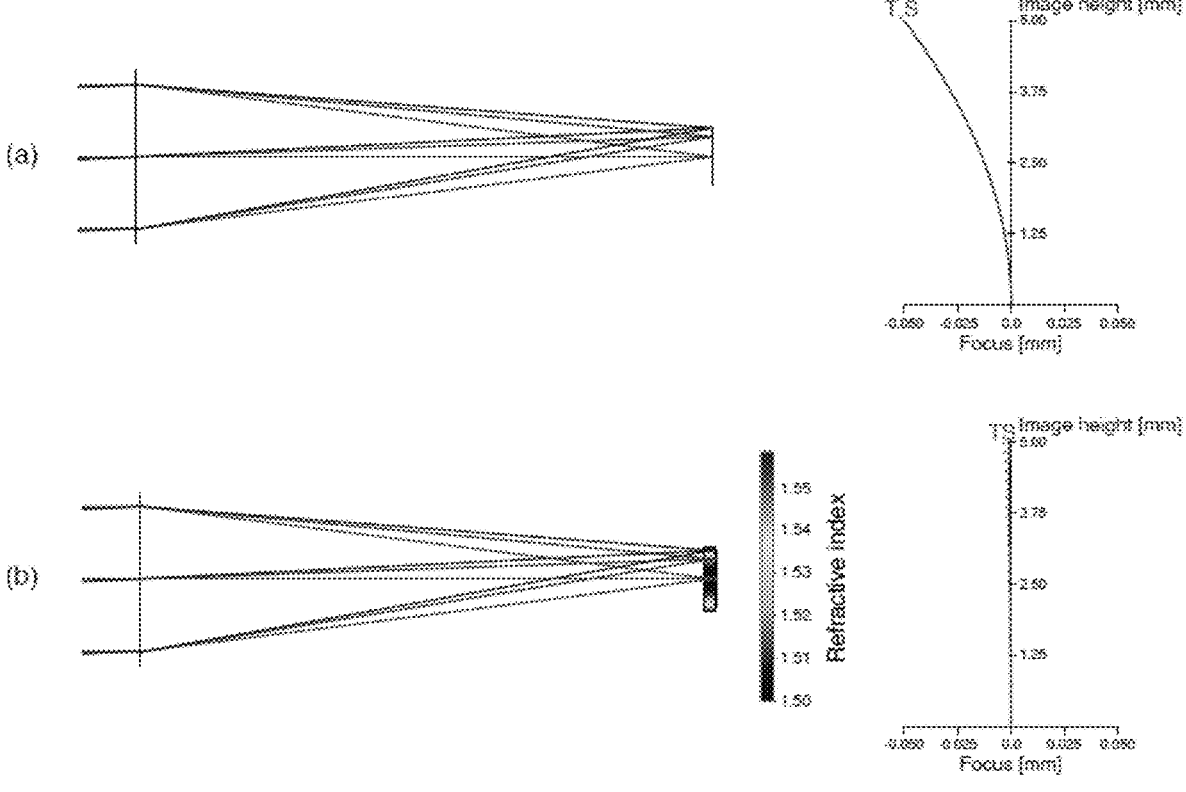
FIG. 3 shows correction of Petzval curvature using GRIN cover piece with a planar detector. (a) Optical system with Petzval curvature. (b) Same optical system with Petzval curvature corrected using GRIN cover piece. Slight error in field curves is due to non-telecentricity of off-axis fields-of-view.

An example design using GRIN cover piece to perform FC correction is shown in FIG. 3.

The degree of FC correction from GRIN cover piece depends on two factors. First, the range of refractive index variation Δn in the GRIN corresponds to the range of image shift that can be imparted for FC correction. For example, a homogeneous cover piece of Δn=0 can only impart a single value for the image shift. In GRIN, values for Δn are limited by fabrication processes. GRIN by additive manufacturing can achieve Δn~2, although for most GRIN optics Δn<0.1.

With constraints on Δn, a second influential factor for imparting large enough image shifts is the cover plate thickness t. As can be seen in Eq. (4), the thickness t directly scales the image shift d. Although larger thicknesses can impart greater FC correction, thicker cover piece increases the length of the optical system and introduces greater non-FC aberrations such as spherical aberration. However, the cover piece refractive index profile can be optimized to reduce these effects. Homogeneous cover piece in DSLR cameras typically ranges from 0.1-3 mm while smaller format detectors such as in cell phones are <1 mm.

For the case of a fully telecentric optical system where the chief rays for all fields-of-view are normally incident on the planar surface of the GRIN cover piece, the expression in Eq. (5) is exact; however, this is rarely the case. For non-telecentric fields-of-view where chief rays are non-normally incident on the cover piece, Eq. (5) is approximate and results in incomplete flattening of the image, as shown in the field curves of FIG. 3(b).

Further correction to fully flatten the image can be made in three ways. First, an alternate expression can be derived for the requisite refractive index given the chief ray angle of incidence. Second, the correction to the GRIN profile can be determined by optimization. Third, additional degrees of freedom for FC correction with non-telecentricity can be accessed by incorporating a longitudinal variation in refractive index in addition to the transverse variation, n(x,y,z).

Design of GRIN Cover Piecees

In its most basic form, a GRIN cover piece (CG) can be made with a radial quadratic refractive index profile to correct the 3rd order field curvature (FC) aberration, Petzval curvature. Astigmatism, also a 3rd order aberration, can be mitigated, but not fully corrected, using a radial quadratic GRIN CG that flattens the medial field, which is at the midpoint of the sagittal and tangential fields. One of ordinary skill will understand that the refractive index profile of the lens may be varied according to the intended use of the lens.

In certain embodiments, the refractive index profile may be one of, but not limited to, radial quadratic, radial quadratic plus higher order radial terms ($r^4$, $r^6$, etc.), toroidal (not rotationally symmetric; different curvatures along x and y), or cylindrical (subtype of toroidal with no curvature along one axis). In further embodiments, the refractive index profile may be any of the transverse profiles listed herein with an added longitudinal refractive index variation. In certain embodiments, the longitudinal variation is used to correct higher order effects due to the finite thickness of the GRIN cover piece and finite airspace between cover piece and detector. In certain embodiments, the longitudinal variation is used to correct higher order effects due to non-telecentricity, as mentioned above.

Figure 4:
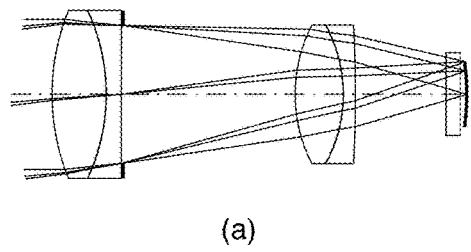
FIG. 4 shows a design example of a Petzval portrait lens incorporating field flattening GRIN cover piece. (a) The conventional Petzval portrait lens has significant Petzval field curvature resulting in a strongly curved imaged surface deviating from the planar surface required for planar imaging detectors. (b) GRIN cover piece with a radial quadratic refractive index profile can flatten the image surface to be compatible with planar imaging detectors and high image quality.
Figure 4:
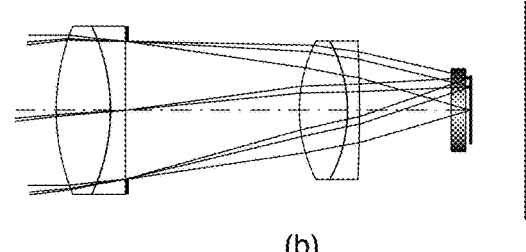

For example, the well-known Petzval portrait lens design is capable of correcting all low-order aberrations except for Petzval FC. As a result, the image surface is strongly quadratic, as shown in FIG. 4(a). This results in significant loss in image quality when used with a standard planar imaging detector (e.g., CMOS, etc.). By incorporating a GRIN CG with a radial quadratic refractive index profile, the image surface can be flattened to provide high image quality with a planar detector, as in FIG. 4(b).

This can also be accomplished to a lesser degree by adding a "field flattener" lens element near the image plane, although unlike GRIN CG, a field flattener cannot be placed directly at an image due to its finite thickness from its non-planar surface sag. There are two disadvantages in adding a field flattener lens. First, an additional lens element increases the system weight. Second, often there is a mechanical restriction on placing lens elements near an image detector, such as in an SLR camera where there must be ~40 mm of clearance for the flip mirror. Although using the Petzval portrait lens with a curved imaging detector is an option; these detectors are not easily manufactured at scale and are not readily available.

In addition to the low-order Petzval FC correction, GRIN CG can also incorporate higher-order polynomial dependence to subsequently correct higher-order FC aberrations. The combination of different orders of FC aberrations may result in the image surface being non-monotonic. For example, an image surface $z(r)=r^2-r^4$ where $r\in[-1,1]$ has an inflection point forming a "W" shaped image surface. To flatten this image using a GRIN CG, the appropriate refractive index terms, $n(r)\propto r^2-r^4$, can be incorporated. This freedom of the refractive index profile of the GRIN CG allows for flexibility in correcting different orders of FC aberrations, which are present in all optical systems and especially consequential in systems with large fields-of-view (FOV) and/or aspheric surfaces.

Overall, this is an important distinction between field flattening GRIN CG and a traditional field flattener lens element, which contains spherical surfaces and can only be used to correct Petzval, the lowest order FC aberration. The commonly held notion of field flattener lenses is limited to this low-order case and does not extend to lenses with higher-order surfaces to correct higher-order FC aberrations.

Moreover, GRIN CG can be placed directly adjacent to the image plane due to its plane-parallel surface form factor while a field flattener lens must be offset from the image due to its finite surface sag. Typically, a field flattener must be placed even farther from the image due to mechanical constraints while cover piece is already conventionally placed directly adjacent to the imaging detector surface.

In the present application, as noted increasing the GRIN thickness and/or Δn increases the extent to which FC can be corrected. Currently, homogeneous cover piece ranges from ~0.2-4 mm. In general terms, the thickness for GRIN cover piece may be in the range of 0.2-8 mm. One of ordinary skill will understand that the thickness of the lens involves different trade-offs dependent on the design of the lens. One of ordinary skill will understand that custom formats, e.g., space/satellite and military applications, may have physical and optical parameters that are outside those typically seen; the methods and systems described herein can be adapted to any such designs.

In particular embodiments, the thickness of the GRIN cover piece is in the range of less than 0.001 mm, less than 0.002 mm, less than 0.003 mm, less than 0.004 mm, less than 0.005 mm, less than 0.006 mm, less than 0.007 mm, less than 0.008 mm, less than 0.009 mm, less than 0.01 mm, less than 0.02 mm, less than 0.03 mm, less than 0.04 mm, less than 0.05 mm, less than 0.06 mm, less than 0.07 mm, less than 0.08 mm, less than 0.09 mm, less than 0.1 mm, less than 0.2 mm, less than 0.3 mm, less than 0.4 mm, less than 0.5 mm, less than 0.6 mm, less than 0.7 mm, less than 0.8 mm, less than 0.9 mm, less than 1 mm, less than 2 mm, less than 3 mm, less than 4 mm, less than 5 mm, less than 6 mm, less than 7 mm, or less than 8 mm.

In particular embodiments, the thickness of the GRIN cover piece is in the range of greater than 0.001 mm, greater than 0.002 mm, greater than 0.003 mm, greater than 0.004 mm, greater than 0.005 mm, greater than 0.006 mm, greater than 0.007 mm, greater than 0.008 mm, greater than 0.009 mm, greater than 0.01 mm, greater than 0.02 mm, greater than 0.03 mm, greater than 0.04 mm, greater than 0.05 mm, greater than 0.06 mm, greater than 0.07 mm, greater than 0.08 mm, greater than 0.09 mm, greater than 0.1 mm, greater than 0.2 mm, greater than 0.3 mm, greater than 0.4 mm, greater than 0.5 mm, greater than 0.6 mm, greater than 0.7 mm, greater than 0.8 mm, greater than 0.9 mm, greater than 1 mm, greater than 2 mm, greater than 3 mm, greater than 4 mm, greater than 5 mm, greater than 6 mm, greater than 7 mm, or about 8 mm.

In further embodiments, the thickness of the GRIN cover piece is in the range between about 0.001-0.002 mm, 0.001-0.003 mm, 0.001-0.004 mm, 0.001-0.005 mm, 0.001-0.006 mm, 0.001-0.007 mm, 0.001-0.008 mm, 0.001-0.009 mm, 0.001-0.01 mm, 0.001-0.02 mm, 0.001-0.03 mm, 0.001-0.04 mm, 0.001-0.05 mm, 0.001-0.06 mm, 0.001-0.07 mm, 0.001-0.08 mm, 0.001-0.09 mm, 0.001-0.1 mm, 0.001-0.2 mm, 0.001-0.3 mm, 0.001-0.4 mm, 0.001-0.5 mm, 0.001-0.6 mm, 0.001-0.7 mm, 0.001-0.8 mm, 0.001-0.9 mm, 0.001-1 mm, 0.001-2 mm, 0.001-3 mm, 0.001-4 mm, 0.001-5 mm, 0.001-6 mm, 0.001-7 mm, or about 0.001-8 mm.

In certain embodiments, the range for GRIN Δn may be between 0.01 and 0.4. In other embodiments, the range for GRIN Δn may be between 0.001 to 2. In particular embodiments, the range for GRIN Δn is less than 0.001, less than 0.002, less than 0.003, less than 0.004, less than 0.005, less than 0.006, less than 0.007, less than 0.008, less than 0.009, less than 0.01, less than 0.02, less than 0.03, less than 0.04, less than 0.05, less than 0.06, less than 0.07, less than 0.08, less than 0.09, less than 0.1, less than 0.2, less than 0.3, less than 0.4, less than 0.5, less than 0.6, less than 0.7, less than 0.8, less than 0.9, less than 1, less than 1.1, less than 1.2, less than 1.3, less than 1.4, less than 1.5, less than 1.6, less than 1.7, less than 1.8, less than 1.9, or less than 2.

In particular embodiments, the range for GRIN Δn is greater than 0.001, greater than 0.002, greater than 0.003, greater than 0.004, greater than 0.005, greater than 0.006, greater than 0.007, greater than 0.008, greater than 0.009, greater than 0.01, greater than 0.02, greater than 0.03, greater than 0.04, greater than 0.05, greater than 0.06, greater than 0.07, greater than 0.08, greater than 0.09, greater than 0.1, greater than 0.2, greater than 0.3, greater than 0.4, greater than 0.5, greater than 0.6, greater than 0.7, greater than 0.8, greater than 0.9, greater than 1, greater than 1.1, greater than 1.2, greater than 1.3, greater than 1.4, greater than 1.5, greater than 1.6, greater than 1.7, greater than 1.8, greater than 1.9, or about 2. One of ordinary skill will understand that the upper and lower bounds of ranges herein described may be chosen according to the particular demand of a specific design.

In further embodiments, the range for GRIN Δn is between about 0.001-0.002, 0.001-0.003, 0.001-0.004, 0.001-0.005, 0.001-0.006, 0.001-0.007, 0.001-0.008, 0.001-0.009, 0.001-0.01, 0.001-0.02, 0.001-0.03, 0.001-0.04, 0.001-0.05, 0.001-0.06, 0.001-0.07, 0.001-0.08, 0.001-0.09, 0.001-0.1, 0.001-0.2, 0.001-0.3, 0.001-0.4, 0.001-0.5, 0.001-0.6, 0.001-0.7, 0.001-0.8, 0.001-0.9, 0.001-1, 0.001-1.1, 0.001-1.2, 0.001-1.3, 0.001-1.4, 0.001-1.5, 0.001-1.6, 0.001-1.7, 0.001-1.8, 0.001-1.9, or about 0.001-2.

In the present application, the GRIN cover piece transverse dimensions would match the accompanying sensor format. In certain embodiments, minimum format is ~4×6 mm, such as found in cell phones. In certain embodiments, maximum format is ~50×70 mm, such as found in IMAX. One of ordinary skill will understand that the transverse dimensions may be varied based on the needs of design and are not limiting on the methods and systems described herein.

Optical Systems Using GRIN Cover Piece

There are several additional factors that are important to note when using GRIN cover piece for FC correction with planar detectors. First, a designed optical system with a planar image for use with a planar detector and homogeneous cover piece can be easily interchanged between different detectors of the same size. Meanwhile, an optical system designed with a deliberate amount of residual FC for correction with GRIN cover piece on a planar detector is only compatible with this specific detector module. This makes the optical system less globally compatible.

Second, an optical design with a planar image would not directly benefit from a curved detector because the FC correction has already performed optically using additional optical elements. Instead, the benefit of GRIN cover piece for FC correction comes when being incorporated during the optical design process.

By correcting FC with the cover piece, new lens design forms are found where the number, type, and order of optical elements is different. Such lenses are preferably designed by optimizing the optical system's elements jointly with the GRIN cover piece such that the amount of GRIN FC correction is variable in the design process.

Alternatively, a design can specify outright a GRIN cover piece with a certain amount of FC correction and then optimize the optical system's lens elements based on this amount of FC correction. In either case, such lenses designed for a specific amount of FC to be compensated for by a specific GRIN cover piece would not be fully compatible with any other detector.

Use of GRIN Cover Piecees

The methods and systems described herein may be used in conjunction with imaging for any relevant electronic device that may incorporate lens technology including, but not limited to, devices such as: mobile phones, electronic notepads, electronic tablets, electronic automobile cameras, wall-mounted screens, portable monitors (e.g. wheeled monitors in medical facilities), electronic helmets, electronic eyewear (e.g. glasses with lens that can display information in real time to the wearer), personal computers, remote viewing technology (e.g. rural doctor client-patient communication devices) and portable electronic devices in general.

The methods and systems described herein may also be used in conjunction with, but not limited to, consumer cameras, e.g., DSLR, mirrorless, point and shoot, motion picture cameras, broadcasting cameras, focal telescopes, focal microscopes. Other uses may be photocopiers, scanners, etc. One of ordinary skill will understand that the methods and systems described herein may be used to correct optical aberrations in imaging in a wide variety of contexts and their application is not limited by the listing of particular usages herein.

Examples of freeform optical systems in which methods and systems described herein may also be used include, but are not limited to, freeform telescopes, freeform cell phone camera lenses, freeform head-mounted display (virtual reality/augmented reality) collimating optics, anamorphic motion picture lenses (use cylindrical/toroidal lenses oriented orthogonal to one another; FC aberrations more complex than a single cylindrical lens), freeform viewfinders, optical systems incorporating Alvarez lenses, freeform spectrometer, or freeform hyperspectral imager.

In the present application, to demonstrate the higher-order FC aberration correction of GRIN CG, a design example is presented below in the form of compact imagers commonly found in mobile devices (e.g., cell phones, etc.). These designs typically image large FOVs and possess highly aspheric surfaces, although still rotationally symmetric. For these reasons, different orders of FC aberrations must be corrected in the design to avoid significant loss in image quality. This is achieved by incorporating additional optical elements, which increase the system size and weight; however, such increases in size and weight are substantially less than otherwise would occur in absence of GRIN CG.

The present application is further illustrated by the following examples that should not be construed as limiting. The contents of all references, patents, and published patent applications cited throughout this application, as well as the Figures and Tables, are incorporated herein by reference.

EXAMPLES

Figure 5:
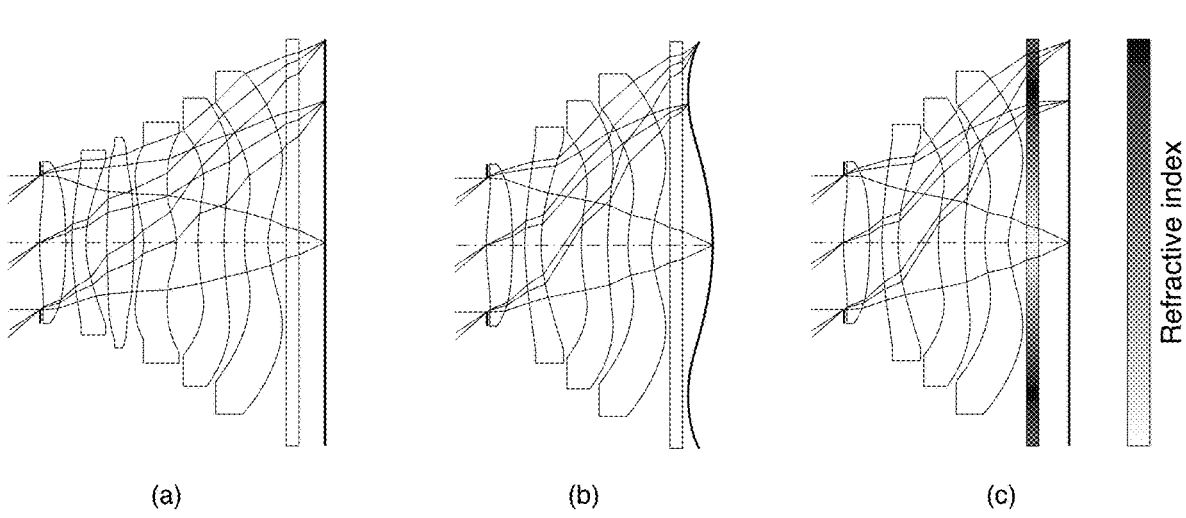
FIG. 5 shows a design example of a compact imager for mobile devices incorporating field flattening GRIN cover piece. (a) 6-element design is required for producing a flat field image. Design uses a homogeneous cover piece. (b) 4-element design reduces system size and weight at the cost of significant field curvature aberrations including higher-order aberrations leading to a non-monotonic image surface. Design uses a homogeneous cover piece. (c) Same 4-element design as in (b) with reduced system size and weight corrects different orders of field curvature aberrations using a GRIN cover piece to produce a flat field image compatible with a planar image detector. Note a non-monotonic refractive index profile is used to flatten the non-monotonic image surface from (b).

Example 1: An Artificially Curved Optical Detector with GRIN CG Correcting Higher Order Optical Aberrations FIG. 5(a) depicts a 6-element design for a mobile device imager incorporating a homogeneous CG that requires all six elements to produce a flat image compatible with a planar image detector. Specifically, the first three lenses with positive-negative-positive power are necessary for balancing Petzval, the lowest order FC aberration. By removing two elements, a 4-element design with homogeneous CG shown in FIG. 5(b) significantly reduces the system size and weight (by about one-third); however, the FC correction from FIG. 5(a) is lost, as can be seen by the non-planar image surface. In addition, this image surface is non-monotonic due to the presence of different orders of FC aberrations due to the large FOV and aspheric surfaces. The non-planar image surface captured by a planar image detector leads to a loss in image quality across the FOV.

To flatten the image surface while maintaining the more compact 4-element design, a GRIN CG can be incorporated as shown in FIG. 5(c) to present a flat image to a planar image detector for much improved image quality. The refractive index profile of the GRIN CG in this case is also non-monotonic to correct the present non-monotonic FC aberrations from the design in FIG. 5(b). This correction cannot be achieved with a conventional field flattener lens that would only be able to correct Petzval, the lowest order FC aberration, with its spherical surfaces.

Example 2: Freeform Optical Systems with GRIN CG

Freeform optical systems, which do not possess an axis of rotational symmetry, introduce freeform FC aberrations that produce non-rotationally symmetric image surfaces. These different freeform FC aberrations can also be corrected using GRIN CG by use of a freeform GRIN (F-GRIN) refractive index distribution.

Figure 6:
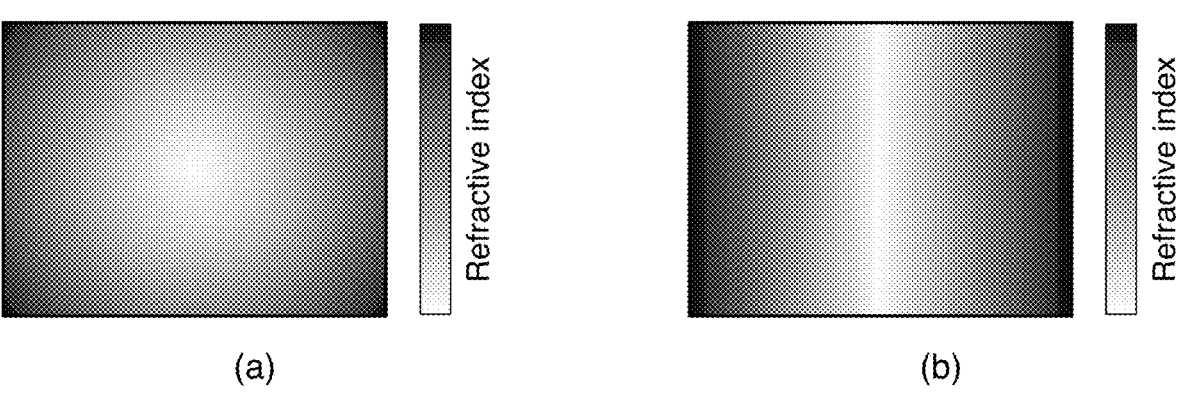
FIG. 6 shows transverse x,y view of GRIN CG for a rectangular image detector. (a) GRIN CG with a rotationally symmetric refractive index profile may only correct FC aberrations found in rotationally symmetric optical systems. (b) F-GRIN CG with a cylindrical refractive index profile is capable of correcting freeform FC aberrations.

This concept can be demonstrated with a cylindrical lens, a type of freeform optic, that introduces freeform FC aberrations resulting in a cylindrical (non-rotationally symmetric) image surface. As seen in FIG. 6, a cylindrical F-GRIN CG is able to flatten this cylindrical image surface while a conventional field flattener lens with spherical surfaces cannot. F-GRIN CG can be applied more generally to freeform optical systems beyond just cylindrical ones, which still possess one axis of plane symmetry.

Example 3: Reflective Freeform Telescope

Figure 7:
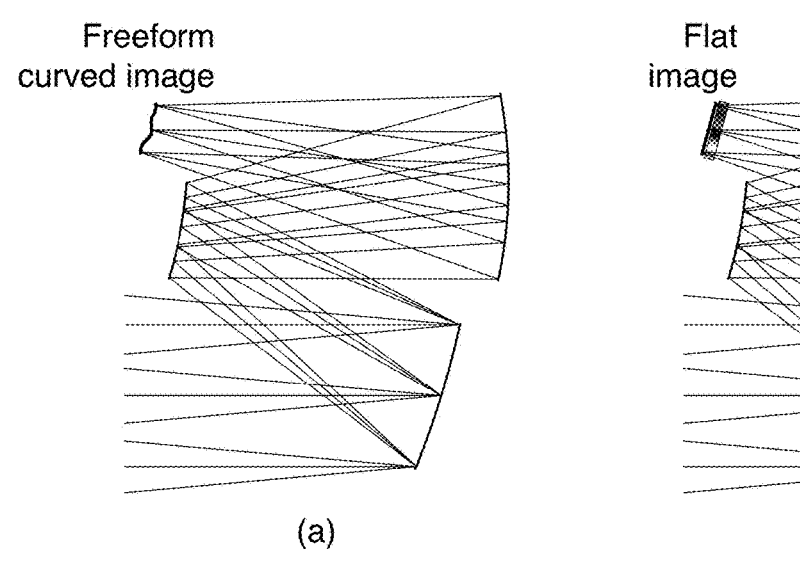
FIG. 7 shows a three-mirror unobscured freeform telescope used over a wide field-of-view has (a) a freeform curved image surface due to the presence of uncorrected freeform field curvature aberrations. (b) A freeform GRIN cover piece is capable of flattening the freeform image surface.
Figure 7:
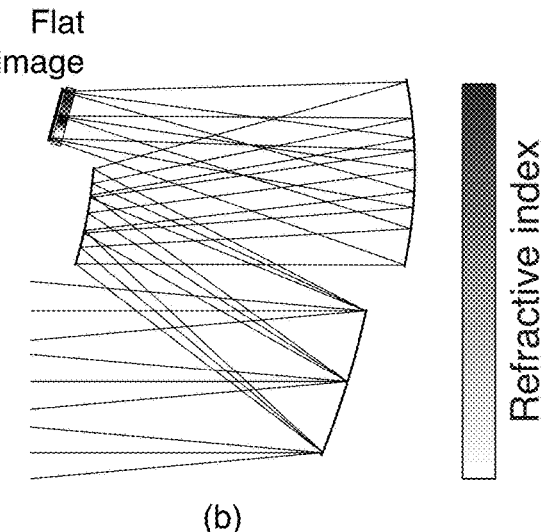

Currently, the most common application of freeform surfaces is in off-axis, unobscured reflective telescopes. For the example in FIG. 7, three reflective freeform surfaces are used in the reflective optical system to form an image. Due to the presence of uncorrected freeform field curvature aberrations, the image surface is of a curved freeform shape, as in FIG. 7(a). A curved freeform image surface also has no axis of rotational symmetry, unlike with Petzval curvature which yields a curved but rotationally symmetric image surface. The addition of a freeform GRIN (F-GRIN) cover piece is capable of flattening this freeform image surface to be compatible with a planar imaging detector, as in FIG. 7(b). The required F-GRIN refractive index profile is also freeform meaning there is no axis of rotational symmetry in the refractive index profile. This example shows that the methods and systems described herein can be applied to a fully reflective system.

Example 4: Catadioptric Telescope

Figure 8:
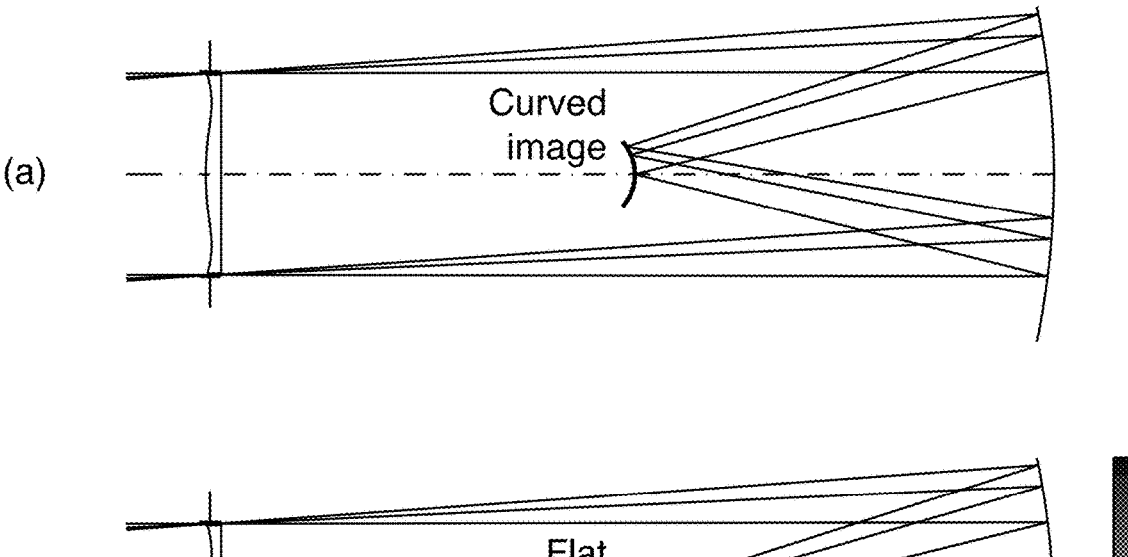
FIG. 8 shows the Schmidt camera with uncorrected Petzval curvature has (a) an outward curving image surface with no means of correction. (b) GRIN cover piece with radial quadratic profile and positive power can correct the field curvature.
Figure 8:
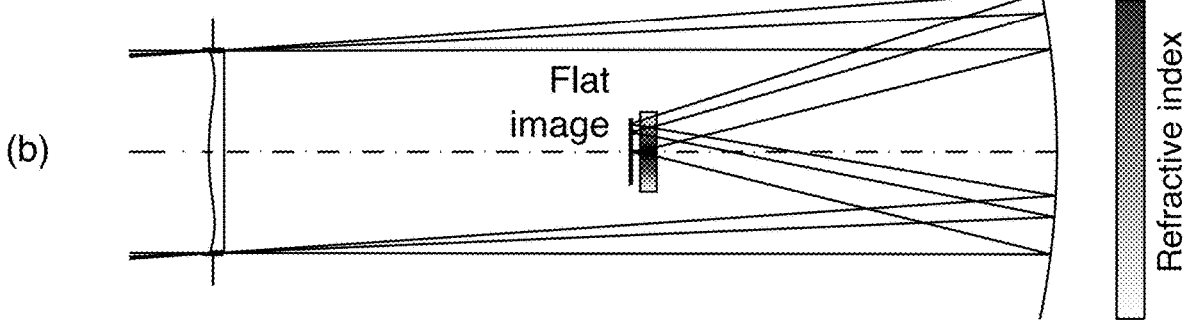

The Schmidt camera, also known as the Schmidt telescope, is an optical system that has only one powered surface: a concave spherical mirror. By placing an aspheric corrector plate at the aperture stop which is located at the center of curvature of the mirror, all primary monochromatic aberrations can be corrected except for Petzval field curvature. The Schmidt camera produces a stigmatic image but one that is located on a curved surface, making it incompatible with planar imaging detectors without loss of image quality, as shown in FIG. 8(a). A GRIN cover piece with a radial quadratic refractive index profile can correct the Petzval curvature and yield a flattened image, as in FIG. 8(b). Note that the Schmidt camera is not strictly a "reflective system" since it uses a combination of refractive optics (aspheric corrector plate) and reflective optics (concave mirror). This is known as a catadioptric system, which combines the use of both refractive and reflective elements. This Schmidt camera example shows the methods and systems herein can be applied to catadioptric systems.

Most refractive systems with positive power, such as the Petzval portrait lens shown previously, have an inward curving field (i.e., curving towards the lens) which requires a negative powered element (either field flattener lens or GRIN cover piece) to flatten the image. Here, for the case of the Schmidt camera, the odd number of reflections makes the image outward curving (i.e., curving away from the mirror), which instead requires a positive powered element (either field flattener lens or GRIN cover piece) to flatten the image. This is depicted in FIG. 8(b) where the refractive index in the center of the GRIN is higher than the edges, making it a positive powered element. The Petzval portrait lens example from before has the opposite where the refractive index is lower in the center and higher at the edges, making it a negative powered element.

Example 5: GRIN Lens at Internal Image Planes

The GRIN Lens can also be placed at internal image planes; the function is the same, but there is no physical detector. This mean that the methods and GRIN lens described herein can operate in any system that has an internal image that may or may not have a detector. The methods and GRIN lens described herein can be used in any relay optical system, any time reticles are used, and virtually any system with an eyepiece.

As an illustrative example, the methods and GRIN lens described herein can be used in a rifle scope or a microscope that has a reticle located at the internal image plane between the objective and the eyepiece. This internal image still suffers from the same field curvature as if there was a detector at that internal image. However, the GRIN lens is placed at this internal image, or the reticle is placed directly on or inside the GRIN lens, which corrects the field curvature problems.

Furthermore, lens systems typically suffer from concave field curvature so relaying an image tends to compound the field curvature errors making it worse (more important to correct) with each relay. This makes this application even more important than using the methods and GRIN lens described herein directly on a planar detector.

While various embodiments have been described above, it should be understood that such disclosures have been presented by way of example only and are not limiting. Thus, the breadth and scope of the subject compositions and methods should not be limited by any of the above-described exemplary embodiments but should be defined only in accordance with the following claims and their equivalents.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the components and steps in any sequence which is effective to meet the objectives there intended, unless the context specifically indicates the contrary.

What is claimed is:

1. An artificially curved optical detector consisting essentially of:

a planar detector, and a single gradient index (GRIN) lens cover piece having an exterior surface and an interior surface, wherein the interior surface of the GRIN lens cover piece is directly adjacent to the planar detector, wherein the GRIN lens cover piece is capable of receiving electromagnetic radiation from a source on the exterior surface and further wherein the range of refractive index of the GRIN lens cover piece field flattens the received electromagnetic radiation as said radiation passes through the GRIN lens so as to reduce optical aberrations and form a planar image on a planar image surface of the planar detector.

2. The artificially curved optical detector of claim 1, wherein the GRIN lens cover piece has a range of refractive index variation $\Delta n$ where $\Delta n$ is less than 2.

3. The artificially curved optical detector of claim 1, wherein the GRIN lens cover piece has a thickness under 8 mm.

4. The artificially curved optical detector of claim 1, wherein the GRIN lens cover piece field flattens the received electromagnetic radiation and reduces optical aberrations caused by Petzval curvature and astigmatism.

5. The artificially curved optical detector of claim 4, wherein the GRIN lens cover piece is made with a radial quadratic refractive index profile.

6. The artificially curved optical detector of claim 1, wherein the GRIN lens cover piece field flattens the received electromagnetic radiation and reduces higher-order field curvature optical aberrations.

7. The artificially curved optical detector of claim 6, wherein the GRIN lens cover piece is made with both a radial quadratic refractive index profile and higher-order polynomial dependence profile.

8. The artificially curved optical detector of claim 1, wherein the GRIN lens cover piece is made with a non-monotonic refractive index profile.

9. The artificially curved optical detector of claim 1, wherein the GRIN lens cover piece is made with a freeform refractive index profile.

10. An optical system, comprising:

the artificially curved optical detector of claim 1;

one or more optical elements wherein said optical elements are in an array, wherein said array of optical elements is in an alignment with said artificially curved optical detector, wherein said array is capable of receiving electromagnetic radiation from a source and wherein said received electromagnetic radiation passes through said optical elements and into said aligned artificially curved optical detector and wherein said aligned artificially curved optical detector field flattens the received electromagnetic radiation so as to image the received electromagnetic radiation onto an image surface as a planar image.

11. The optical system of claim 10, wherein said optical elements are a plurality of optical elements.

12. The optical system of claim 10, wherein said optical elements comprise aspheric surfaces.

13. The optical system of claim 10, wherein said optical elements are rotationally symmetric.

14. The optical system of claim 10, wherein said optical elements are non-rotationally symmetric.

15. The optical system of claim 10, wherein said optical elements are refractive lenses that refract the received electromagnetic radiation so that higher-order field curvature optical aberrations occur.

16. The optical system of claim 10, wherein said optical elements are reflective optical elements.

17. A method of correcting field curvature aberrations in imaging electromagnetic radiation on a planar detector, comprising the steps of:

producing a gradient index (GRIN) lens cover piece with a range of refractive index variation;

positioning the GRIN lens cover piece adjacent to a planar detector, wherein the GRIN lens cover piece has an exterior surface and an interior surface, wherein said interior surface is directly adjacent to the planar detector, wherein a single GRIN lens cover piece is associated with the planar detector;

field flattening electromagnetic radiation received by the exterior surface of the GRIN lens cover piece so as to reduce optical aberrations and form a planar image on a planar image surface of the planar detector.

18. The method of claim 17, comprising the further step of: refracting the received electromagnetic radiation through one or more optical elements prior to the exterior surface of the GRIN lens cover piece receiving the electromagnetic radiation.

19. The method of claim 17, wherein the optical aberrations are Petzval curvature and astigmatism.

20. The method of claim 17, wherein the optical aberrations are higher-order field curvature aberrations.

* * * * *